United States Patent
Cardakli et al.

(10) Patent No.: US 6,751,416 B2
(45) Date of Patent: Jun. 15, 2004

(54) RECONFIGURABLE OPTICAL RECOGNITION OF BIT INFORMATION IN A DIGITAL DATA STREAM WITH DIFFERENT BIT RATES

(75) Inventors: Mustafa C. Cardakli, Los Angeles, CA (US); Deniz Gurkan, Los Angeles, CA (US); Sanggeon Lee, Union City, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 676 days.

(21) Appl. No.: 09/777,623

(22) Filed: Feb. 5, 2001

(65) Prior Publication Data

US 2001/0040712 A1 Nov. 15, 2001

Related U.S. Application Data

(60) Provisional application No. 60/180,024, filed on Feb. 3, 2000.

(51) Int. Cl.$^7$ ................................................. H04J 14/00
(52) U.S. Cl. ..................................................... 398/54
(58) Field of Search ...................... 398/54, 87; 370/389, 370/391, 392

(56) References Cited

U.S. PATENT DOCUMENTS

| | | | | |
|---|---|---|---|---|
| 5,581,388 A | * | 12/1996 | Gambini et al. ............... | 398/54 |
| 5,617,233 A | * | 4/1997 | Boncek ....................... | 398/51 |
| 6,559,989 B1 | * | 5/2003 | Kim et al. .................. | 398/101 |

* cited by examiner

*Primary Examiner*—Jason Chan
*Assistant Examiner*—Shi K. Li
(74) *Attorney, Agent, or Firm*—Fish & Richardson P.C.

(57) ABSTRACT

Techniques and devices for providing reconfigurable and variable-bit-rate optical header recognition for an optical switch.

17 Claims, 5 Drawing Sheets

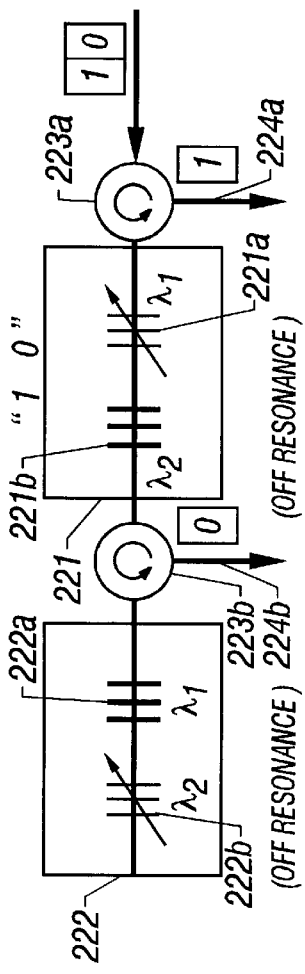
FIG. 3B  Header "10"
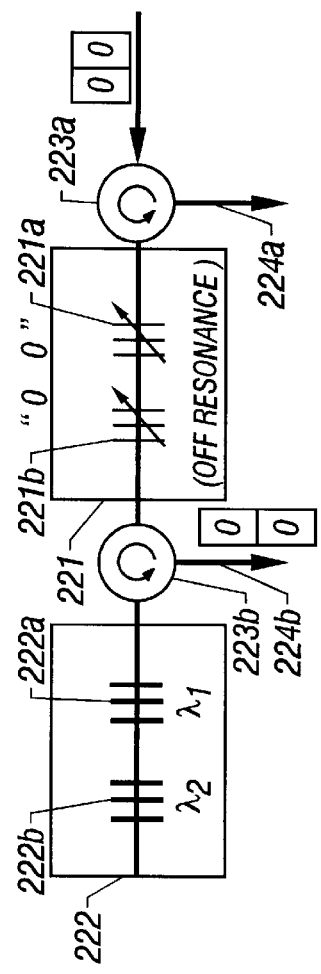
FIG. 3C  Header "00"
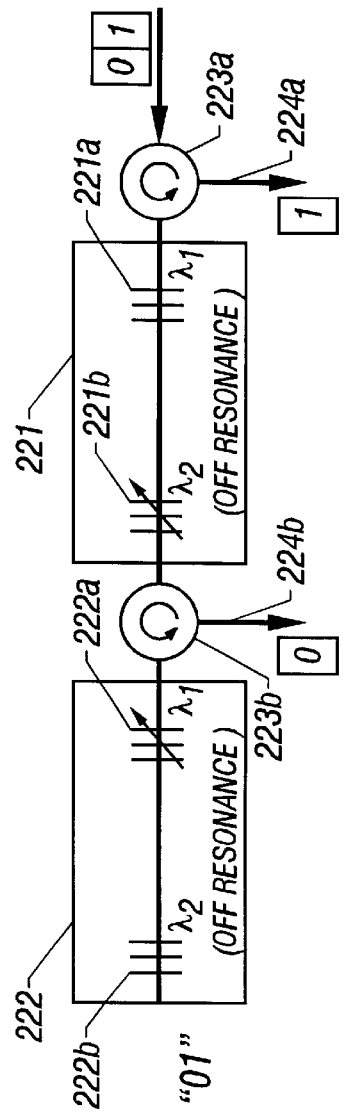
FIG. 3D  Header "01"

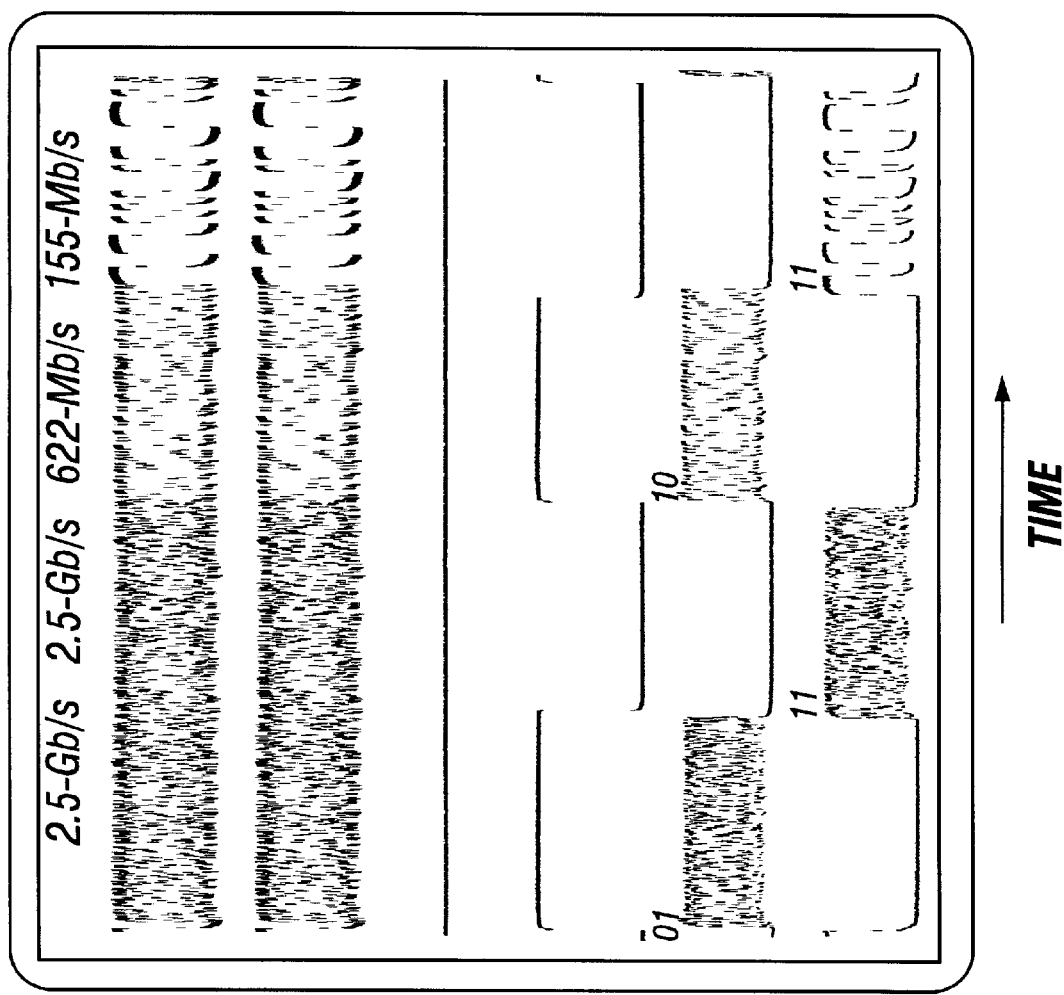

RECONFIGURABLE OPTICAL RECOGNITION OF BIT INFORMATION IN A DIGITAL DATA STREAM WITH DIFFERENT BIT RATES

This application claims the benefit of U.S. Provisional Application No. 60/180,024, filed Feb. 3, 2000.

TECHNICAL FIELD

This application relates to detection and recognition of bit information in digital data streams, and more specifically, to optical techniques and systems for detecting certain bit information such as headers in optical digital data streams.

BACKGROUND

Digital data may be transferred in communication networks in form of data packets. Each packet may include two separate parts. One part of the packet includes payload bits that carry the actual information or data. Another part of the packet includes header bits for data management such as addressing, sequencing, routing or other control information. Information or data from a signal source may be represented by a sequence of data packets.

A communication network may be designed to transfer information from a signal source to a destination by transferring the respective data packets individually in order to efficiently use the resources in the network. Hence, the data packets from the signal source may be transferred to their destination out of the sequence and through different physical signal links. Data packets from different signal sources thus may be mixed in a data stream directed from one node to another node. Each data packet is identified by its header. A switching device in such a network, e.g., a switch in a node, can direct each received data packet to one of the two or more desired output ports based on the header information.

The switching operation of the switching device is generally dictated by a switch look-up table that designates various header bit values to different switching operations. Hence, a header recognition mechanism may be needed to read and decode the header of an incoming data packet to generate a switch control signal according to the look-up table. The switch receives the switch control signal and performs the corresponding switch operation.

A portion or entirety of a communication network may be optical and hence is operable to transfer, manage, or process digital data superimposed on optical carriers. Optical wavelength-division multiplexing (WDM) allows transmission of multiple optical communication channels at different wavelengths through a single optical fiber for high-speed and broadband data communication applications. Various optical switches may be deployed in such a network to optically switch the data packets at switching speeds higher than many electronic switches. The header recognition mechanism for such an optical switch may also be implemented optically to provide high-speed optical header recognition.

SUMMARY

The optical header-recognition techniques and devices of the present disclosure are devised in part to recognize headers of data packets that have different bit rates less than or equal to a pre-selected maximum bit rate. An optical modulator may be used to simultaneously modulate two unmodulated, continuous-wave optical signals at two different wavelengths in response to signal modulations of an optical carrier signal that carry data packets with headers having at least a first bit and a second bit. The two modulated signals at the two different wavelengths carry the same data packets and synchronize with each other in time.

The two modulated signals may be directed into an optical delay unit that produces a time delay between light signals of the two different wavelengths. This time delay is set to be substantially equal to a pre-selected minimum bit length in time that corresponds to the pre-selected maximum bit rate so that the first bit of a header represented in one modulated signal at least partially overlaps with the second bit of the header represented in another modulated signal for each of said data packets.

A detection unit may be used to receive and detect the modulated signals with the relative time delay from the optical delay unit to determine whether values of the first and second bits in the header of each data packet respectively match a selected first bit value and a selected second bit value.

The optical header-recognition techniques and devices of the present disclosure may also provide a reconfigurable header recognition by adjusting the optical delay unit into different configurations for determining a match between bit values of a received header and different sets of selected bit values. In one embodiment, the optical delay unit may include two output optical terminals each operable to output either or both of the modulated signals with the time delay. The detection unit is configured so that different output assignments of the modulated signals to the two output optical terminals represent different sets of selected first and second bit values to be matched. The optical delay unit is operable to change from one output assignment of the modulated signals to the two output optical terminals to another output assignment in response to a control signal.

These and other embodiments and associated features are set forth in the accompanying drawings, the description, and the claims.

BRIEF DESCRIPTION OF THE DRAWINGS

FIGS. 3A, 3B, 3C, and 3D show specific examples of the optical delay unit shown in FIG. 2 under different configurations for different switching operations of the optical switch.

FIGS. 4A, 4B, 4C, 4D, 4E, and 4F show various measured signals in an optical header-recognition module based on the design in FIG. 2.

DETAILED DESCRIPTION

The present optical header-recognition techniques and devices tap a small fraction of an optical carrier signal modulated to carry data packets in the data stream. The tapped signal is then processed by the optical header-recognition device to extract the header information and produces a switch control signal according to the look-up table of the switch. The optical switch that receives the optical carrier signal is then controlled by the switch control signal to switch the data packets to their designated output ports. The following description illustrates the techniques and devices by using an optical switch with two output ports. A packet with a matched header will be switched to one designed output port and a packet with an unmatched header will be switched to the other output port.

Figure 1:
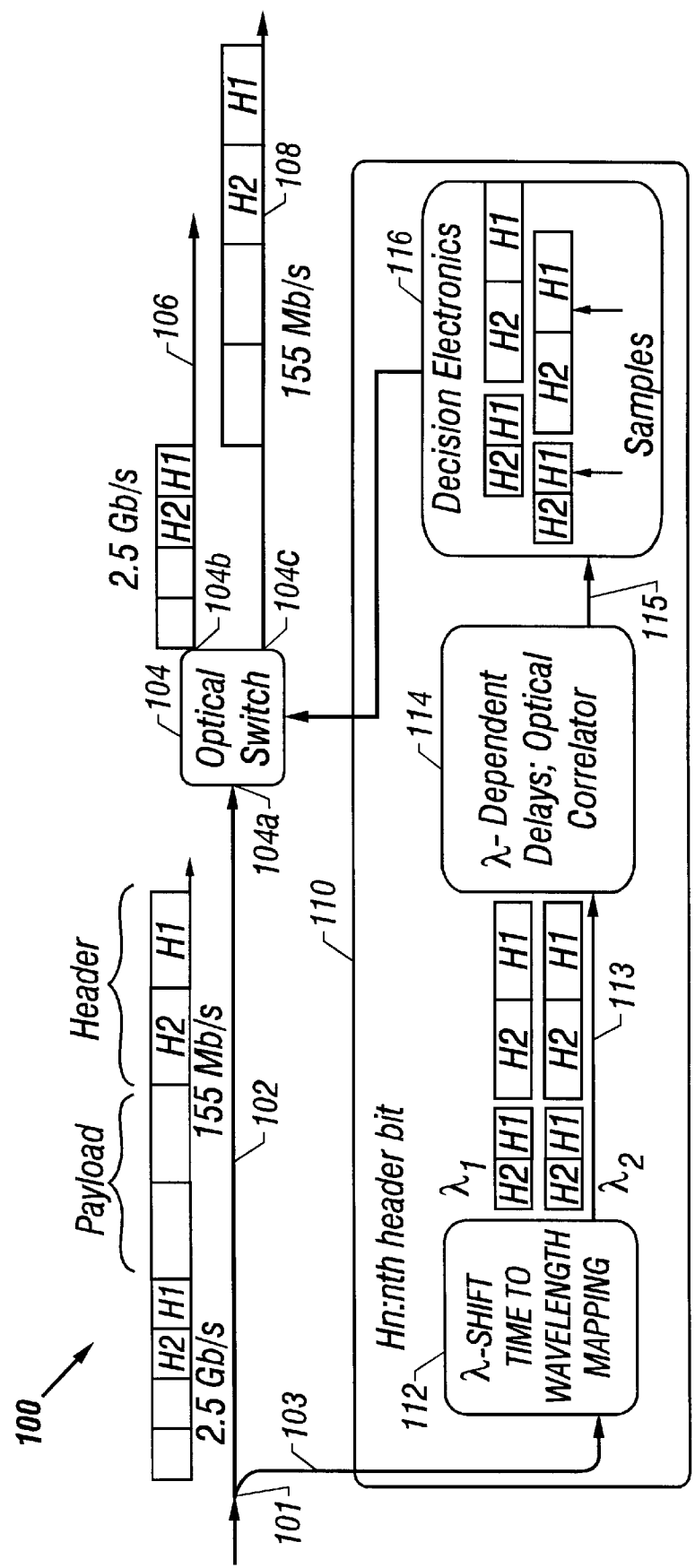
FIG. 1 shows an optical header recognition module capable of detecting headers of data packets with different bit rates according to one embodiment.

FIG. 1 shows an exemplary optical header-recognition module 110 and an associated optical switch 104. The optical switch 104 has an input port 104a and two output ports 104b and 104c. The input port 104 is coupled to an optical fiber or other optical transmission link to receive an input data stream 102 with data packets modulated on an optical carrier signal at a carrier wavelength. In general, the data packets in the input stream 102 may have different bit rates, e.g., 2.5 Gb/s, 155 Mb/s, etc. The optical switch 104 is operable to switch an input data packet to either of the output ports 104b and 104c. Under the control by the optical header-recognition module 110, the optical switch 104 sends only those data packets with headers matched to a selected header to a selected output port, e.g., the first output port 104b as an output stream 106, and sends those data packets with unmatched headers to the second output port 104c as another output stream 108. Data packets with matched headers in the stream 106 may have the same or different bit rates.

An optical coupler 101, e.g., a fiber coupler, may be used to tap a fraction of the input carrier signal as the input monitor stream 103. The optical header-recognition module 110 processes the input monitor stream 103 to determine whether there is a match between each received header and the selected header for the port 104b, and produces a switch control signal 117 for controlling the switch 104 based on the determination. The processing of the input monitor stream 103 by the module 110 can be independent from the untapped portion of the stream 102 to the switch 104 so that any changes, such as wavelength conversion or frequency chirping, in the processed input monitor stream 103 will not be manifested in the stream 102 received by the switch 104.

The optical header-recognition module 110 may include an optical modulation unit 112, an optical delay unit 114, and a detection unit 116. The optical modulation unit 112 is operable to modulate two or more different, unmodulated, continuous-wave optical signals at different control wavelengths to modulated optical signals that carry the same information as in the streams 102 and 103. Notably, as illustrated in the WDM output stream 113 of the modulation unit 112, the modulated signals are synchronized in time with respect to one another in the WDM stream 113 so that the same data packet in different modulated signals arrive at the same time. One implementation of the modulation unit 112 may include an optical cross-gain modulation (XGM) medium in which an optical gain at one wavelength (e.g., the carrier wavelength of the stream 103) changes an optical gain at another wavelength (e.g., different control wavelengths).

In addition, the number of the modulated signals at different control wavelengths are selected to be equal to the number of bits in the header to be matched for controlling the switch 104. Hence, if three adjacent bits in the header are used for controlling the switch 104, the data stream 103 is mapped to three optical modulated signals of different control wavelengths. The following description will use examples of matching two adjacent bits in the headers for controlling the switch 104.

The optical delay unit 114 may be implemented as a wavelength-dependent delay unit that produces a constant relative time delay $\Delta t$ between two light signals at different control wavelengths. For three or more light signals at different wavelengths in a selected sequence of $\lambda_1$, $\lambda_2$, $\lambda_3$, etc. for matching three or more adjacent bits in the header, the delay between $\lambda_1$ and $\lambda_2$, $\lambda_2$ and $\lambda_3$, and so on, is the same amount $\Delta t$. This leads to a delay of $2\Delta t$ between $\lambda_1$ and $\lambda_3$ and so on. When data packets in the input stream 102 have the same bit rate, the delay time $\Delta t$ may be selected as the bit length in time which is inverse of the bit rate. The techniques disclosed are designed to recognize headers of data packets of different bit rates, the delay time $\Delta t$ is selected to be the bit length associated with the maximum bit rate to be transferred in the respective optical network. Hence, if the network supports multiple bit rates up to 2.5 Gb/s, the delay time $\Delta t$ is selected as the minimum bit length of 400 ps. This delay time $\Delta t$ is applied to streams of data packets of various bit rates not exceeding 2.5 Gb/s.

The above delay scheme in the optical delay unit 114 is used to provide at least a partial overlap in time between two adjacent bits in each header, one bit represented by one modulated signal at one control wavelength and the other adjacent bit represented by another, relatively delayed modulated signal at a different control wavelength. For a data packet at the maximum bit rate, two adjacent bits in each header respectively represented by different modulated signals completely overlap in time. The detection unit 116 samples and detects the relatively delayed modulated signals to obtain temporal correlations between the modulated signals to determine whether values of two or more bits in the header of each data packet respectively match corresponding selected bit values for switching to the first output port 104b. If there is a match, the switch control signal 117 sets the switch 104 to the output port 104b; otherwise the switch control signal 117 sets the switch 104 to the output port 104c.

Figure 2:
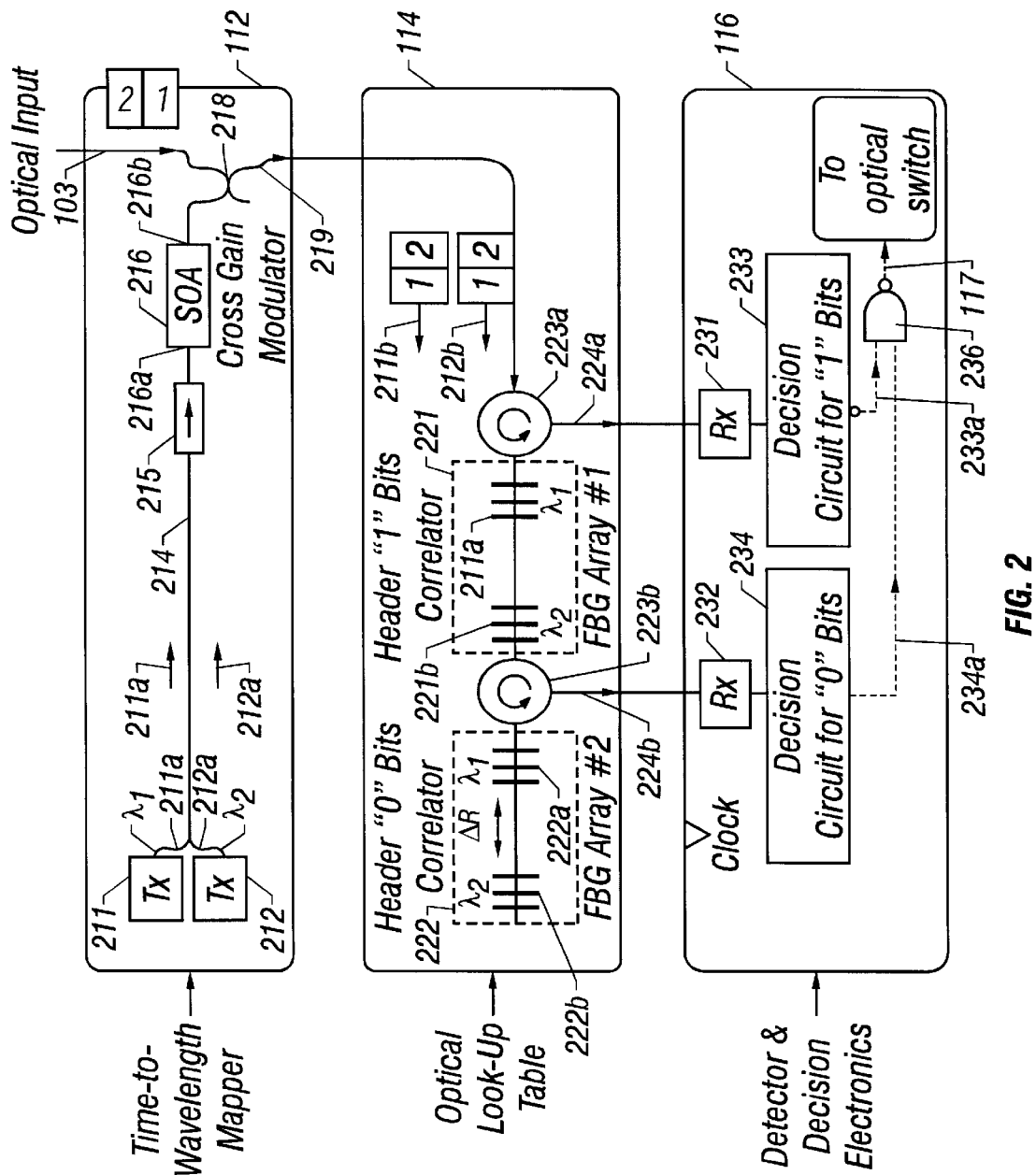
FIG. 2 shows one exemplary optical header recognition module for data packets with 2-bit headers based on the design shown in FIG. 1.

FIG. 2 shows an exemplary implementation of the optical header-recognition module 110 in FIG. 1 for recognizing 2-bit headers. The optical modulation unit 112 is formed by a semiconductor optical amplifier (SOA) 216 as a cross-gain modulator and two optical transmitters 211 and 212 for respectively producing unmodulated, continuous wave optical beams 211a and 212a at two different control wavelengths $\lambda_1$ and $\lambda_2$. An optical coupler 213 combines the beams 211a and 212a into a fiber 214 that is coupled to a first I/O port 216a of the SOA 216 so that the beams 211a and 212a propagate in the semiconductor gain medium along a first direction. The SOA 216 also includes a second I/O port 216b at the opposite side of the gain medium to direct the input monitor beam 103 into the gain medium opposite the first direction. An optical coupler 218 is used to couple the beam 103 into the SOA 216 and to couple the modulated output from the port 216 to a fiber 219.

In operation, the excited carrier population available to amplify the beams 211a and 212a can be depleted by the counter-propagating monitor beam 103. Hence, the intensity modulation in the beam 103 produces a gain modulation for the beams 211a and 212a. As a result, a high intensity period in the beam 103 causes a low intensity period in both beams 211a and 212a and a low intensity period in the beam 103 causes a high intensity period in both beams 211a and 212a. Therefore, the modulation pattern in the beam 103 is copied to the modulated output beams 211b and 212b at the control wavelengths $\lambda_1$ and $\lambda_2$, respectively. Since the modulations to the beams 211a and 212a are performed simultaneously, the modulated signals 211b and 212b are synchronized in time with respect to each another in the fiber 219 in absence of dispersion so that modulations in the modulated signals 211b and 212b representing the same data packet overlap in time and arrive at each location along the fiber at the same time.

This implementation of the optical delay unit 114 includes two fiber grating arrays 221 and 222 that are optically connected in series to receive the modulated signals 211b and 212b. The first fiber grating array 221 is coupled to the fiber 219 to receive the signals 211b and 212b. The second fiber grating array 222 is coupled to receive transmitted light from the first fiber grating array 221. A first optical circulator 223a is coupled in the fiber 219 between the first fiber grating array 221 and the optical modulator 112 to direct light from the optical modulator 112 to the first fiber grating array 221 and to direct light reflected from the first fiber grating array 221 to a first fiber output terminal 224a. A second optical circulator 223a is coupled between the first and the second fiber grating arrays 221 and 222 to direct light transmitted through the first fiber grating array 221 to the second fiber grating array 222 and to direct light reflected from the second fiber grating array 222 to a second fiber output terminal 224b.

Each fiber grating array as illustrated includes two tunable fiber gratings, 221a and 221b in the first array 221, or 222a and 222b in the second array 222 for recognizing two adjacent bits in the header for switching operations. The two fiber gratings in each array are spaced from each other so that the time for the light to travel from one grating to another is one half of the minimum bit length in time associated with the maximum bit rate to be processed by the system in FIG. 1. The two fiber gratings are tuned to reflect light at different wavelengths to produce wavelength-dependent relative delays. Hence, as an example, a light beam at the control wavelength $\lambda_2$ in resonant with the second grating 221b, after transmitting through the first grating 221a and being reflected back by the second grating 221b to the first grating 221a, has a time delay of the minimum bit length relative to an other co-propagating beam at the control wavelength $\lambda_1$ that is reflected by the first grating 221a.

Each fiber grating reflects light at a resonant wavelength, $\lambda = 2n\Lambda$, where n is the effective index of refraction of the fiber core and $\Lambda$ is the grating period. Hence, the reflected wavelength $\lambda$ is tunable by changing the grating parameter, $n\Lambda$. A grating controller may be coupled to each fiber grating to tune the grating in response to a control signal. For example, a fiber stretcher may be used to change the grating period $\Lambda$ to change the reflected wavelength $\lambda$. The first fiber grating, 221a or 222a, is configured and operable to be tuned between at least two grating states: in the first grating state, it transmits light at the first control wavelength $\lambda_1$; in the second grating state, it reflects light at the first control wavelength $\lambda_1$. The first fiber grating is also configured to reflect light at the second control wavelength $\lambda_2$ in both the first and the second grating states. The second grating, 221b or 222b, is configured and operable to be tuned between at least two grating states: it transmits light at the second wavelength $\lambda_2$ in the first grating state and to reflect light at the second wavelength $\lambda_2$ in the second grating state while transmitting light at the first wavelength $\lambda_1$ in both the first and the second grating states.

Therefore, by adjusting the grating states of the gratings 221a, 221b, 222a, 222b in the grating arrays 221 and 222, a reflected light at either of the control wavelengths $\lambda_1$ and $\lambda_2$ may be directed to either of the output terminals 224a and 224b. This output assignment of reflected signals to the output terminals 224a and 224b forms a part of the optical look-up table for determining the match for the optical switch 104. Notably, this output assignment is reconfigurable and hence can be used to adapt to any changes made to the switch 104 in the network. For example, assume the optical switch 104 was initially set to switch data packets with a header "01" to the first output port 104b and subsequently changed to switch data packets with a header "00" to the first output port 104b. The optical header-recognition module 114 shown in FIG. 2 may be reconfigured by switching the gratings to proper grating states, without replacing the module 114.

Another part of the optical look-up table is used to maintain the relative delay equal to the minimum bit length associated with the maximum bit rate between output signals of different wavelengths $\lambda_1$ and $\lambda_2$ at the output terminals 224a and 224b. This condition is desirable for the correlation processing in the detection unit 116. When both reflected signals are reflected by the same grating array and are output at a single output terminal, 224a or 224b, the above condition is automatically satisfied due to the spacing between the two gratings within the array. However, when one signal is reflected by the first grating array 221 and another signal is reflected by the second grating array 222, the signal reflected by the second grating array experiences an extra delay caused by the light propagation from the first grating array 221 to the second grating array 222.

The above extra delay may be compensated by introducing an additional delay in the output terminal 224a by, e.g., placing an optical delay element or an extra loop of fiber in the output terminal 224a. As a result, the delay in a light beam at the wavelength $\lambda_1$ at the output terminal 224b caused by the optical delay unit 114 after reflecting at the grating 222a in the array 222 should be the same as the delay at the output terminal 224a if the same light is reflected by the grating 221a in the array 221. Similarly, the delay in a light beam at the wavelength $\lambda_2$ at the output terminal 224b caused by the optical delay unit 114 after reflecting at the grating 222b in the array 222 should be the same as the delay at the output terminal 224a if the same light is reflected by the grating 221b in the array 221.

The header-recognition module 116 in FIG. 2 implements photodetectors 231, 232, decision circuits 233 and 234, and a logic circuit such as a NAND gate 236 to produce the switch control signal 117 based on the output signals from the terminals 224a and 224b of the optical delay unit 114. The detectors 231 and 232 are operable to detect light at the control wavelengths produced by the optical modulation module 112 and coupled to receive light from the output terminals 224a and 224b, respectively. The decision circuits 233 and 234 are coupled to receive the detector output signals from the detectors 231 and 232 to produce the output logic signals 233a and 234a, respectively. The output 233a is generated by inverting the direct logic output from the decision circuit 233. The decision circuits 233 and 234 are synchronized to a common clock signal to the transition time between the first and second header bits for all different packet bit rates and clocked at the packet repetition rate of the incoming stream 102 to sample the detector output signals. The sampling time window is set to the minimum bit length corresponding to the maximum bit rate.

Figure 3A:
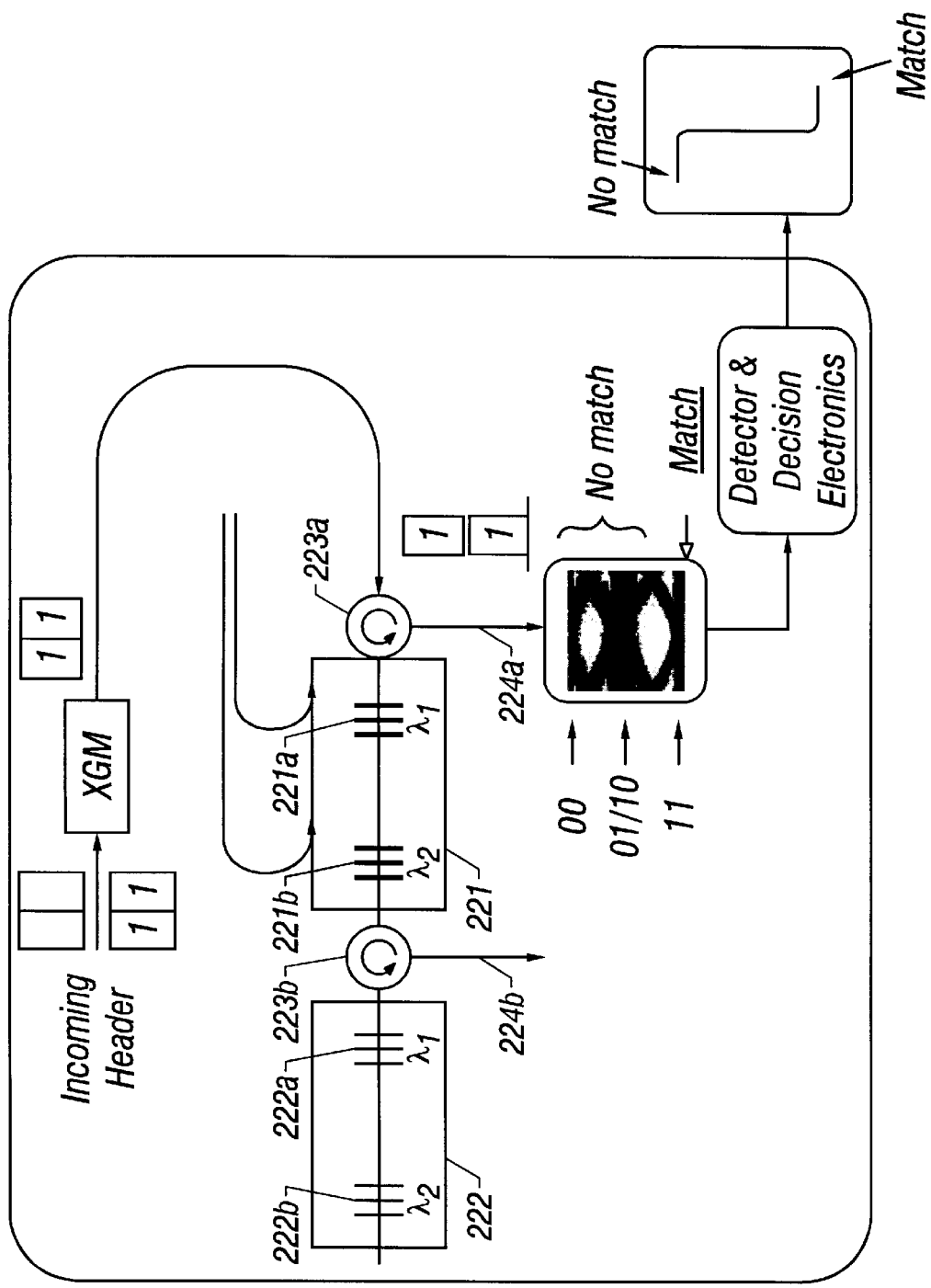

FIGS. 3A, 3B, 3C, and 3D show specific examples of the optical delay unit 114 shown in FIG. 2 under different configurations for different switching operations of the optical switch 104. The first grating array 221 is used to identify "1" bit in the header and the second grating array 222 is used to identify "0" bit in the header. FIG. 3A shows the optical delay unit 114 is set to switch packets with a header "11" to be switched to the output port 104b while other data packets are switched to the output port 104c. The gratings 221a and 221b of the first array 221 are respectively tuned to reflect light at wavelengths $\lambda_1$ and $\lambda_2$, respectively. Under this configuration, no light transmits through the first grating array 221 to reach the second grating array 222. FIG. 3C shows the configuration for matching "00" header where both gratings in the first array 221 are turned off resonance to transmit light at both wavelengths $\lambda_1$ and $\lambda_2$ while both gratings in the second array 222 are tuned to their respective resonance conditions.

FIG. 3B shows the optical delay unit 114 is set to switch packets with a header "10" to be switched to the output port 104b while other data packets are switched to the output port 104c. The grating 221a and 222b are tuned off the resonance to transmit light at both wavelengths $\lambda_1$ and $\lambda_2$. The grating 221b is tuned to reflect the light at $\lambda_2$. The grating 222a is tuned to reflect the light at $\lambda_1$. FIG. 3D shows the configuration for matching "01" header.

FIGS. 4A through 4F show measured signals in the device shown in FIG. 2 in a configuration shown in 3A for matching headers "11". The two control signals produced by the laser transmitters are at 1551.9 nm and 1548.5 nm, respectively, and are different from the carrier wavelength at 1557.7 nm of the input signal FIG. 4A shows that a packet stream carrying mixed packets at 2.5-Gb/s, 622-Mb/s, and 155-Mb/s with a 1.6-ns guard time is tapped and used as an optical input to the optical header-recognition module. FIGS. 4B and 4C respectively show the output signals at terminals 224a and 224b, respectively. FIG. 4D shows the switch signal 117. FIGS. 4E and 4F show the output signals 106 and 108, respectively. The above experiments were performed for bit rates up to 2.5 Gb/s. In practice, such header-recognition devices can operate at higher bit rates up to 40 Gb/s or even higher.

In the above examples, each grating array 222 or 221 includes two tunable fiber gratings for recognizing two adjacent bits in the header for switching operations. In general, the number of gratings in each grating array is equal to the number of bits in the header to be recognized for the switching operations. For example, when 3 bits in the header are used to control the switching operations, 3 tunable gratings with different resonance wavelengths are equally spaced from one another to form the grating array. Accordingly, the 3 different signals of different control wavelengths are used in the optical modulation module to map the data packets in the input data stream.

Although the present disclosure only includes a few embodiments, it is understood that various modifications and enhancements may be made without departing from the following claims.

What is claimed is:

1. A device, comprising:

an input optical terminal to receive at least a portion of an optical carrier signal at a carrier wavelength that is modulated to carry data packets with headers having at least a first bit and a second bit, each data packet having a bit length in time that is not less than a pre-selected minimum bit length;

an optical modulator having a first terminal to receive a first continuous-wave optical signal at a first wavelength and a second continuous-wave optical signal at a second wavelength, and a second terminal coupled to said input optical terminal to receive said portion of said optical carrier signal, said optical modulator configured to simultaneously modulate said first and said second continuous-wave optical signals in response to signal modulations in said optical carrier signal to output at said second terminal a first modulated signal at said first wavelength and a second modulated signal at said second wavelength, wherein said first and said second modulated signals carry said data packets and synchronize with each other in time;

an optical delay unit coupled to receive said first and said second modulated signals and configured to produce a time delay between said first and said second modulated signals, wherein said time delay is substantially equal to said pre-selected minimum bit length to at least partially overlap said first bit of a header represented in one modulated signal with said second bit of said header represented in another modulated signal for each of said data packets; and a detection unit coupled to receive said first and said second modulated signals with said time delay from said optical delay unit and configured to determine whether values of said first and said second bits in said header of each data packet respectively match a selected first bit value and a selected second bit value.

2. The device as in claim 1, wherein said optical delay unit comprises:

first and second fiber grating arrays connected in series, each fiber grating array comprising (1) a first fiber grating operable to transmit light at said first wavelength at a first grating state and to reflect light at said first wavelength at a second grating state and tunable to change between said first and second grating states, said first fiber grating configured to reflect light at said second wavelength in said first and said second grating states, and (2) a second fiber grating operable to transmit light at said second wavelength at a first grating state and to reflect light at said second wavelength at a second grating state and tunable to change between said first and second grating states, said second fiber grating configured to reflect light at said first wavelength in said first and said second grating states, wherein said first and said second fiber gratings are spaced from each other so that it takes light one half of said time delay to travel from one fiber grating to another fiber grating within each fiber grating array;

a first output optical terminal coupled to said first fiber grating array to output light reflected from said first fiber grating array;

a second output optical terminal coupled to said second fiber grating array to output light reflected from said second fiber grating array;

a first optical circulator coupled between said first fiber grating array and said optical modulator to direct light from said optical modulator to said first fiber grating array and to direct light reflected from said first fiber grating array to said first optical terminal; and a second optical circulator coupled between said first and said second fiber grating arrays to direct light transmitted through said first fiber grating to said second fiber grating array and to direct light reflected from said second fiber grating array to said second output optical terminal.

3. The device as in claim 2, wherein said detection unit comprises:

a first photodetector coupled to said first output optical terminal to receive light reflected from said first fiber grating array;

a second photodetector coupled to said second output optical terminal to receive light reflected from said second fiber grating array; and a decision circuit to process output signals from said first and said second photodetectors to determine said match.

4. The device as in claim 2, wherein each fiber grating array further comprises a fiber controller coupled to each of said first and said second fiber gratings and operable to change each fiber grating between said first and said second grating states.

5. The device as in claim 4, wherein said fiber controller includes a fiber stretcher.

6. The device as in claim 1, further comprising an optical switch having an input port that receives a remaining portion of said optical carrier signal, a first output port and a second output port, wherein said optical switch is responsive to a signal from said decision circuit to send a data packet to said first output when said match occurs and a data packet to said second output port when said match does not occur.

7. The device as in claim 1, wherein said optical delay unit includes two output optical terminals each operable to output either or both of said first and said second modulated signals with said time delay, wherein said detection unit is configured so that different output assignments of said first and said second modulated signals to said output optical terminals in said optical delay unit represent different sets of selected first and second bit values to be matched, and wherein said optical delay unit is operable to change from one output assignment of said first and said second modulated signals to said two output optical terminals to another output assignment in response to a control signal.

8. The device as in claim 7, wherein said optical delay unit includes:
   first and second fiber grating arrays connected in series, each fiber grating array comprising (1) a first fiber grating operable to transmit light at said first wavelength at a first grating state and to reflect light at said first wavelength at a second grating state and tunable to change between said first and second grating states, said first fiber grating configured to reflect light at said second wavelength in said first and said second grating states, and (2) a second fiber grating operable to transmit light at said second wavelength at a first grating state and to reflect light at said second wavelength at a second grating state and tunable to change between said first and second grating states, said second fiber grating configured to reflect light at said first wavelength in said first and said second grating states, wherein said first and said second fiber gratings are spaced from each other so that it takes light one half of said time delay to travel from one fiber grating to another fiber grating within each fiber grating array;
   a first optical circulator coupled between said first fiber grating array and said optical modulator to direct light from said optical modulator to said first fiber grating array and to direct light reflected from said first fiber grating array to one of said two output optical terminals; and
   a second optical circulator coupled between said first and said second fiber grating arrays to direct light transmitted through said first fiber grating to said second fiber grating array and to direct light reflected from said second fiber grating array to another of said two output optical terminals.

9. The device as in claim 8, wherein each fiber grating array further comprises a fiber controller coupled to each of said first and said second fiber gratings and operable to change each fiber grating between said first and said second grating states.

10. The device as in claim 9, wherein said fiber controller includes a fiber stretcher.

11. The device as in claim 1, wherein said optical modulator includes a cross-gain optical medium operable to modify an optical gain at said first and said second wavelengths in response to a modulation at said carrier wavelength.

12. The device as in claim 11, wherein said optical modulator includes a semiconductor optical amplifier.

13. A device, comprising:
   an input optical terminal to receive a portion of an optical carrier signal at a carrier wavelength that is modulated to carry data packets with headers having at least a first bit and a second bit, each data packet having a bit length in time that is not less than a pre-selected minimum bit length;
   an optical modulator having a first terminal to receive a first continuous-wave optical signal at a first wavelength and a second continuous-wave optical signal at a second wavelength, and a second terminal coupled to said input optical terminal to receive said portion of said optical carrier signal, said optical modulator configured to simultaneously modulate said first and said second continuous-wave optical signals in response to signal modulations in said optical carrier signal to output at said second terminal a first modulated signal at said first wavelength and a second modulated signal at said second wavelength, wherein said first and said second modulated signals carry said data packets and synchronize with each other in time;
   first and second fiber grating arrays connected in series, each fiber grating array comprising (1) a first fiber grating operable to transmit light at said first wavelength at a first grating state and to reflect light at said first wavelength at a second grating state and tunable to change between said first and second grating states, said first fiber grating configured to reflect light at said second wavelength in said first and said second grating states, and (2) a second fiber grating operable to transmit light at said second wavelength at a first grating state and to reflect light at said second wavelength at a second grating state and tunable to change between said first and second grating states, said second fiber grating configured to reflect light at said first wavelength in said first and said second grating states, wherein said first and said second fiber gratings are spaced from each other so that it takes light one half of said time delay to travel from one fiber grating to another fiber grating within each fiber grating array,
   wherein said first and said second fiber grating arrays are coupled to receive said first and said second modulated signals and configured to produce a time delay between said first and said second modulated signals, wherein said time delay is substantially equal to said pre-selected minimum bit length to at least partially overlap said first bit of a header represented in one modulated signal with said second bit of said header represented in another modulated signal for each of said data packets;
   a first output optical terminal coupled to output light reflected from said first fiber grating array;
   a second output optical terminal coupled to output light reflected from said second fiber grating array;
   a first optical circulator coupled between said first fiber grating array and said optical modulator to direct light from said optical modulator to said first fiber grating array and to direct light reflected from said first fiber grating array to said first output optical terminal;
   a second optical circulator coupled between said first and said second fiber grating arrays to direct light transmitted through said first fiber grating to said second fiber grating array and to direct light reflected from said second fiber grating array to another of said two output optical terminals;

an optical delay element coupled between said first optical circulator and said first output optical terminal to introduce an additional delay in light signals at said first output optical terminal so that an optical wave at either of said first and said second wavelengths undergoes substantially the same delay at said first output optical terminal by reflecting by said first fiber grating array as at said second output optical terminal by transmitting through said first fiber grating array and reflecting by said second fiber grating array; and a detection unit coupled to receive said first and said second modulated signals respectively at said first and said second wavelengths from at least one of said first and said second output optical terminals, said detection unit configured and operable to determine whether values of said first and said second bits in said header of each data packet respectively match a selected first bit value and a selected second bit value.

14. The device as in claim 13, wherein each fiber grating array further comprises a fiber controller coupled to each of said first and said second fiber gratings and operable to change each fiber grating between said first and said second grating states.

15. The device as in claim 14, wherein said fiber controller includes a fiber stretcher.

16. The device as in claim 13, wherein said optical modulator includes a cross-gain optical medium operable to modify an optical gain at said first and said second wavelengths in response to a modulation at said carrier wavelength.

17. The device as in claim 16, wherein said optical modulator includes a semiconductor optical amplifier.

* * * * *

UNITED STATES PATENT AND TRADEMARK OFFICE
CERTIFICATE OF CORRECTION

| | | |
|---|---|---|
| PATENT NO. | : 6,751,416 B2 | Page 1 of 1 |
| APPLICATION NO. | : 09/777623 | |
| DATED | : June 15, 2004 | |
| INVENTOR(S) | : Mustafa C. Cardakli et al. | |

It is certified that error appears in the above-identified patent and that said Letters Patent is hereby corrected as shown below:

Col. 1 lines 13 - 14

Please insert the following

--This invention was made with government support under Contract No. F49620-97-1-0238 awarded by the AFOSR. The government has certain rights in the invention.--

Signed and Sealed this

First Day of May, 2007

JON W. DUDAS
*Director of the United States Patent and Trademark Office*